United States Patent [19]

Sangl

[11] 3,996,858
[45] Dec. 14, 1976

[54] LINEAR SOLENOID MOTORS

[76] Inventor: Donald W. Sangl, 11 Blue Jay Drive, Brentwood, N.Y. 11717

[22] Filed: Mar. 4, 1974

[21] Appl. No.: 447,653

[52] U.S. Cl. .................. 104/148 LM; 104/138 R
[51] Int. Cl.² ........................................ B61B 13/12
[58] Field of Search ............ 104/148 MS, 148 LM, 104/148 SS, 23 FS, 138 R, 138 G

[56] References Cited

UNITED STATES PATENTS

| 936,395 | 10/1909 | Worthington | 104/23 FS |
|---|---|---|---|
| 1,685,593 | 9/1928 | Auble | 104/138 R |
| 1,885,662 | 11/1932 | Whitehorn | 104/148 LM |
| 2,041,607 | 5/1936 | Hopkins | 104/148 LM |
| 3,508,497 | 4/1970 | Matsukata | 104/138 R |
| 3,697,908 | 10/1972 | Highsmith | 104/148 LM |
| 3,792,665 | 2/1974 | Nelson | 104/148 LM |
| 3,837,285 | 9/1974 | Goering | 104/23 FS |

FOREIGN PATENTS OR APPLICATIONS

| 855,456 | 11/1960 | United Kingdom | 104/148 MS |
|---|---|---|---|
| 1,194,438 | 6/1970 | United Kingdom | 104/148 LM |

Primary Examiner—Trygve M. Blix
Assistant Examiner—Reinhard J. Eisenzopf

[57] ABSTRACT

An electrically operated linear solenoid motor designed to propel a passenger carrying vehicle through a guideway section. Innovations embodied in this disclosure make possible continuous propulsion of vehicles operating individually within an elongated guideway network comprised of multiple segments of the invention.

4 Claims, 4 Drawing Figures

LINEAR SOLENOID MOTORS

This invention relates to dynamo electric machines and more particularly to an improved linear solenoid motor of unique design especially suited for propulsion of a passenger carrying vehicle.

Many solenoid motors have been patented in this class but this invention is different from the old in that it includes several novel improvements important to its intended use as a continuous duty passenger vehicle propulsion device. These improvements are: (a) proximity switch sensing of vehicle position for precision and high reliability, (b) absence of limitations and physical interference of mechanical switches, (c) solid state switching of propulsion coil current providing control of electric current necessary for passenger carrying system, (d) rapid switching possible with solid state switching conserves electrical energy, (e) solid state switches generate none of the electrical interference typical of mechanical switches, (f) vehicle headway is automatically maintained by "locking out" last propulsion coil passed, (g) "free" forced air cooling of propulsion coils and ventilation of guideway interior, (h) remote monitoring of vehicle locations is possible.

A general object of the invention is to provide a vehicular propulsion by linear solenoid electric motor means that could make individually occupied electrically powered mass transportation systems possible for the first time.

Another object of the invention is to provide a cargo vehicle propulsion by linear solenoid electric motor means that could be used for short or long distance cargo hauling.

Mass transportation systems in certain urban and suburban areas have not materialized or have failed, primarily because not all of the potential passengers want to go to or from a common destination. The invention makes possible the development of a transportation system that would have practically all the freedom of destination choice as an automobile with the inherent advantages of electrical power consumption, energy conservation, safety, weather immunity, efficient land use, etc. provided by a mass transportation system.

The various features and advantages of the invention will emerge more fully from the application description and accompanying drawings wherein a preferred form of the invention is disclosed. It should be understood though, that the description and drawings are illustrative only and are not to be taken as limiting the invention except insofar as it is limited by the claims. Propulsion coil size, placement, and physical separation as well as vehicle position sensing element placement are shown in a typical configuration. Exact configuration of these and other elements of the invention would depend on and would be optimized for particular needs (i.e. vehicle cruise, acceleration, deceleration).

Passenger vehicle suspension within the guideway is shown as wheel means for purposes of illustration. Due to the absence of any on-board power requirements, most known suspension methods including magnetic levitation, air guides, air pressure jets, etc. would work equally well.

Figure 1:
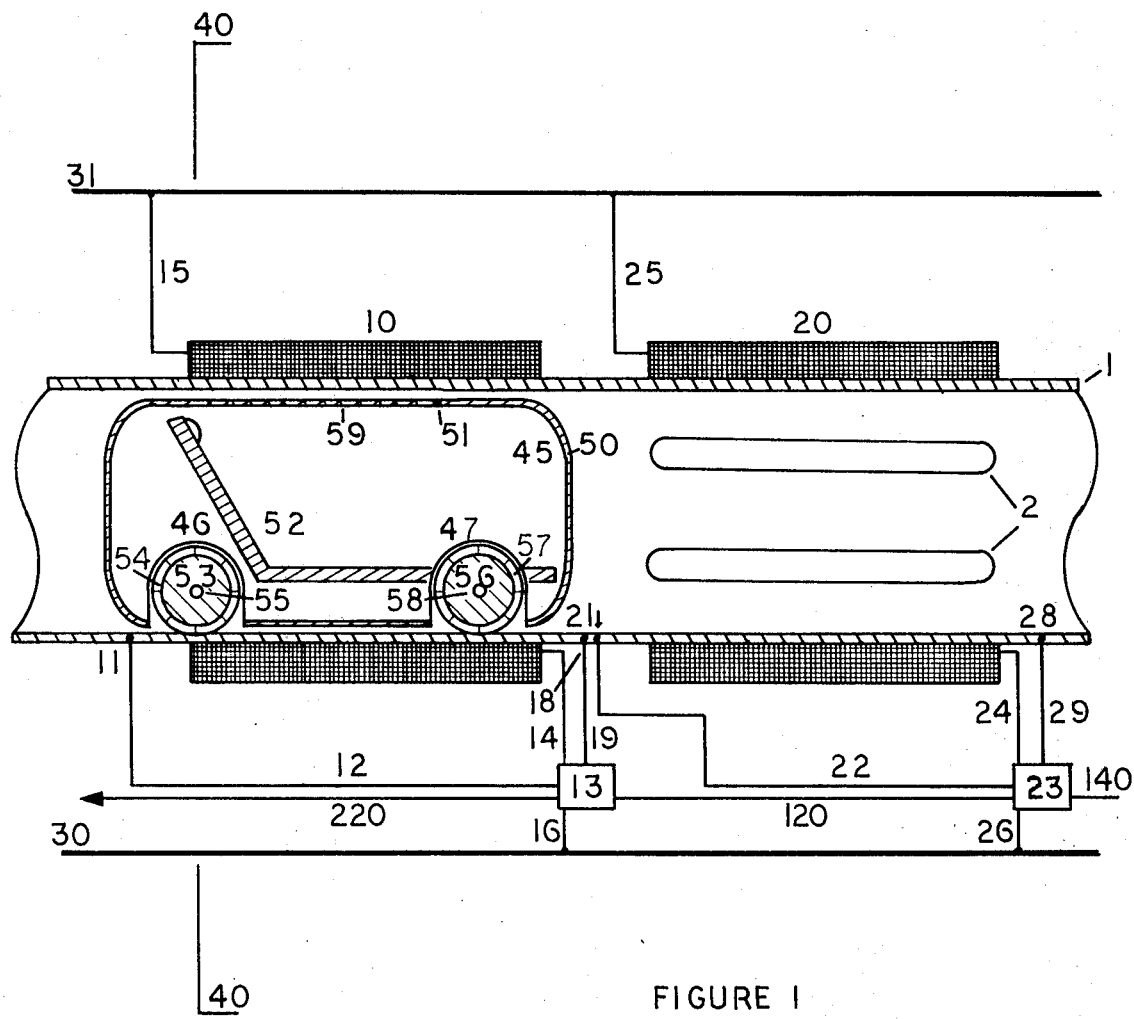
FIG. 1 is a longitudinal sectional view through the linear solenoid motor showing a segment of the propulsion system, guideway, and a vehicle.
Figure 2:
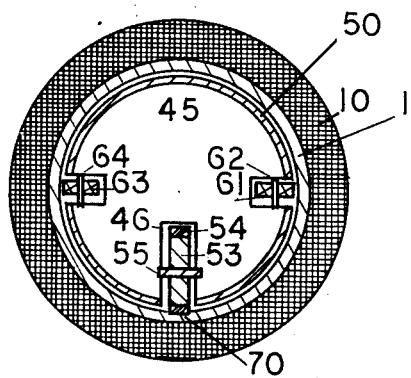
FIG. 2 is a cross sectional view of the propulsion coils, guideway, and vehicle taken on the line 40—40 of FIG. 1.
Figure 3:
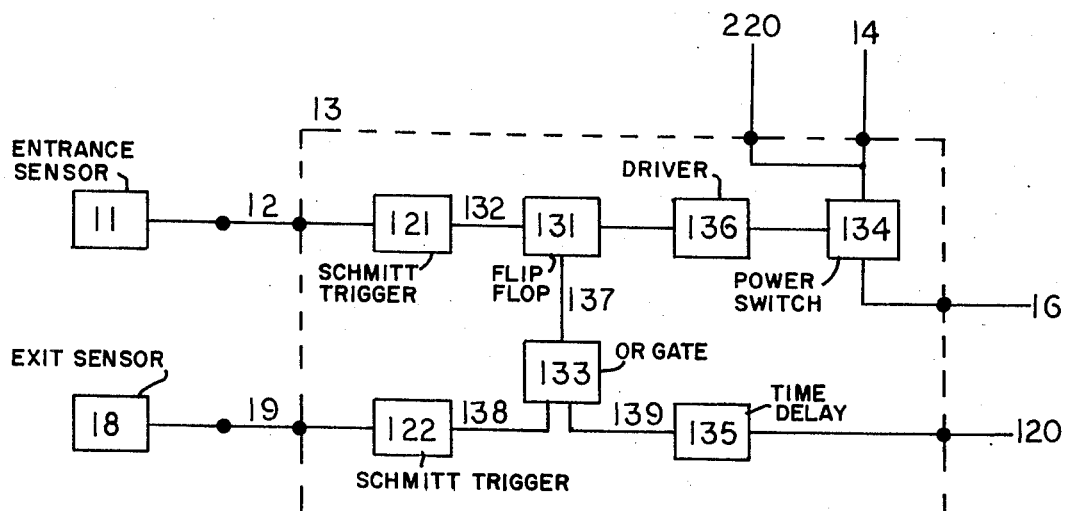
FIG. 3 is an electrical schematic diagram of the propulsion system electronic control circuitry.

The guideway 1 can be fabricated from any non-conductive rigid material. A preferred material is a translucent member of the plastics family. Ventilation slots 2 are completely through the guideway 1 walls within the longitudinal distance of each propulsion coil 10,20 and allow air to be pushed outside of the guideway 1 as each vehicle proceeds through it in a manner so as not to impede vehicle progress. After vehicle passage air will flow back into the guideway 1 interior through ventilation slots 2. A second purpose of ventilation slots 2 is to provide a free supply of air current circulation to cool the propulsion coils 10,20.

The passenger vehicle 45 is designed to carry one passenger at a time. It is intended to be extremely simple and cheap to construct. The vehicle shell 50 is fabricated of ferromagnetic material in a modified cylindrical shape. Door and window assembly 59 provides passenger entry/exit and visibility. Door and window assembly 59 is a section of vehicle 45 exterior composed largely of ferro magnetic material and hinging about hinge 51. Component 52 is a passenger seat affording a comfortable semi-reclining position. Foreward main suspension wheel 56 rolls on axle 58 and tire 57 engages groove 70 formed in guideway 1. Rear main suspension wheel 56 rolls on axle 55 and tire 54 engages groove 70 formed in guideway 1. Components 46 and 47 are wheel cover assemblies. Left lateral guide wheel 63 rolls on axle 64 and presses against guideway 1 interior surface. Right lateral guide wheel 61 rolls on axle 62 and presses against guideway 1 interior surface. It is intended that main suspension wheels 53,56 support the entire vehicle 45 and passenger weight. Lateral guide wheels 61,63 control vehicle 45 lateral motion at slow speeds and when following curved guideway 1 segments.

The propulsion coils 10,20 are wound circumferentially around guideway 1. Proximity sensor 11 detects the presence of a vehicle within attraction distance of propulsion coil 10 and hence is identified as propulsion coil 10 entrance sensor. When entrance sensor 11 detects the presence of a vehicle about to enter propulsion coil 10 an electrical impulse is transmitted through wire 12 to switching circuit 13. Switching circuit 13 acts so as to make an electrical connection between wire 14 and wire 16. In this condition an electrical current path exists from supply bus 30 thru wire 16 thru switching circuit 13 thru wire 14 thru propulsion coil 10 thru wire 15 to return bus 31. Electrical current flow thru propulsion coil 10 produces a magnetic flux field which acts on the ferromagnetic vehicle 45 in such a manner as to attempt to center the vehicle 45 in the flux field. Timing and fast electrical current switching are of prime importance in the operation of such a system. It can be seen that when entrance sensor 11 senses the presence of a vehicle, propulsion coil 10 is energized VIA switching circuit 13 and the vehicle will be drawn towards the center of the flux field which is centered on propulsion coil 10. If the energizing current were allowed to continue flowing thru propulsion coil 10, a force equal to the attracting force would restrain the vehicle from proceeding past the point where the vehicle is centered within the propulsion coil 10 flux field. To prevent this opposing force and to provide a continuous unidirectional motion it is important that the energizing current be stopped at precisely the correct time. Exit sensor 18 senses when the vehicle is near the flux field center. An electrical impulse generated by exit sensor 18 proceeds thru wire 19 and resets switching circuit 13 to an open position. In this condition switching circuit 13 prevents current from flowing thru propulsion coil 10, there is no flux field within propulsion coil 10 and hence no forces will act upon vehicle 45.

Slightly prior to encountering exit sensor 18 the vehicle presence was sensed by propulsion coil 20 entrance sensor 21. An electric impulse generated by entrance sensor 21 proceeds thru wire 22 to cause switching circuit 23 to close. At this time an electric current path exists from supply bus 30 thru wire 26 thru switching circuit 23 thru wire 24 thru propulsion coil 20 thru wire 25 to return bus 31. Electrical current flow thru propulsion coil 20 produces a magnetic flux field which acts to attract vehicle 45. This attracting force plus the vehicle 45 momentum imparted by propulsion coil 10 action continues the forward motion of vehicle 45. It is apparent that many solenoid motor sections could be combined to form a guideway system with several vehicles within. Each vehicle would proceed independently of all others and continuous motion would be achieved by imparting a thrust pulse from each propulsion coil to each vehicle.

Propulsion coil size, placement along the guideway, entrance sensor placement, and exit sensor placement can be varied to produce sections of the system for cruise propulsion, acceleration, and deceleration.

Subcircuits utilized in switching circuit 13 and their functions are: Components 121 and 122 are Schmitt trigger circuits that convert a voltage level change A,C into an electrical impulse B,D. Component 131 is a bistable subcircuit (known as a J-K flip-flop) with a set input that will change its condition to a "set" state and a direct reset input that will hold the subcircuit in a "reset" state. Component 133 is an OR gate that allows either a pulse from Schmitt trigger 122 or a voltage level from time delay subcircuit 135 to reset bistable subcircuit 131. Component 136 is a driver subcircuit for controlling the power switching subcircuit 134. Power switching subcircuit 134 is connected as shown to control the impedance between wire 14 and wire 16. When the power switching subcircuit 134 is set to a conducting condition by the voltage on wire 136 the impedance between wire 14 and wire 16 is nearly zero and full current (as determined by other components in the total circuit) will flow. When the power switching subcircuit 134 is set to a non-conducting state by the voltage on wire 136 the impedance between wire 14 and wire 16 is very high and no current will flow.

Figure 4:
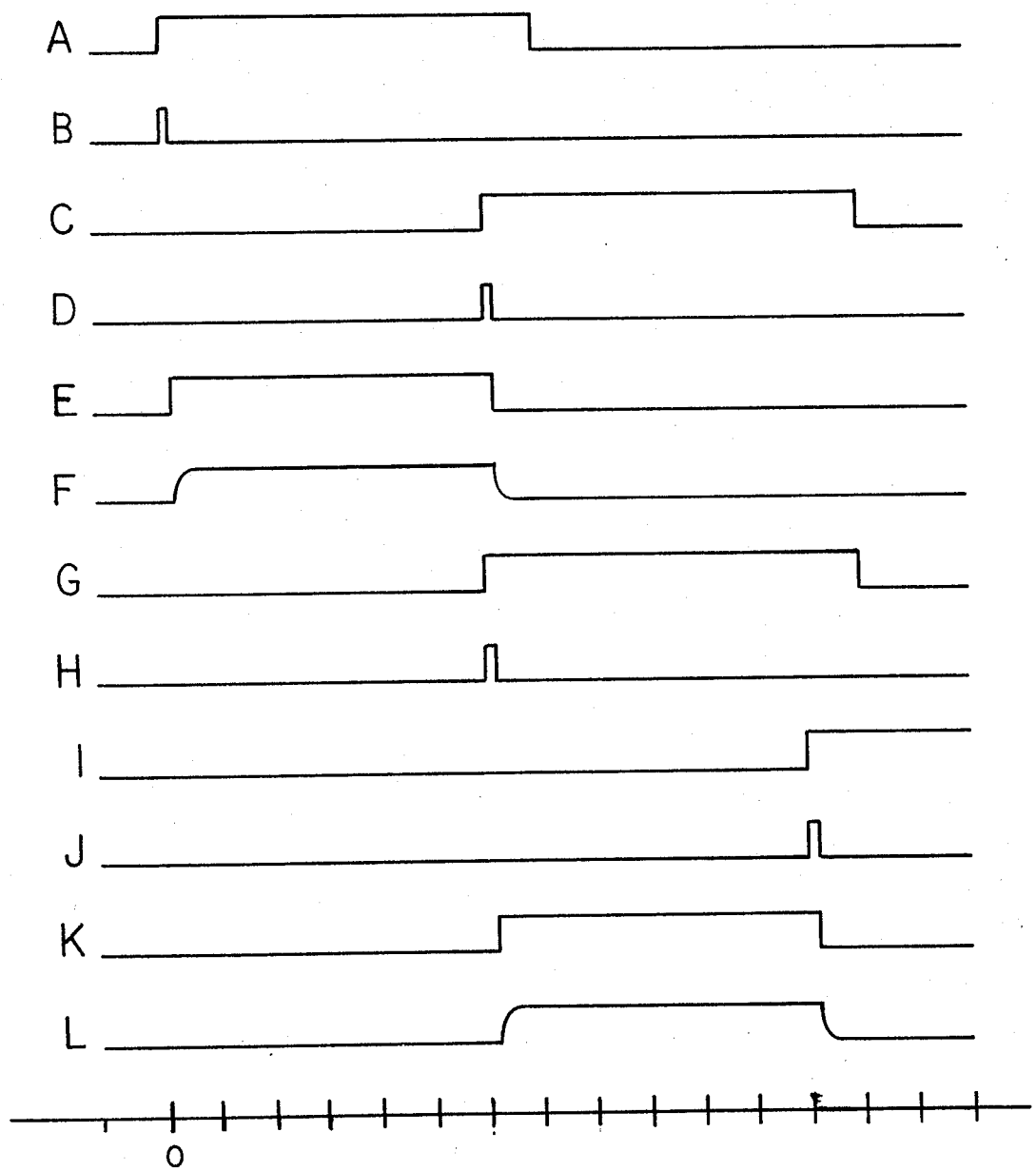
FIG. 4 is a diagram of electrical waveshapes at key points within the propulsion system electronic control circuitry.

In FIG. 4 electrical waveshapes are shown versus an elapsed time scale where time 0 is when an approaching vehicle triggers entrance sensor 11. Waveshape A is the output of entrance sensor 11, the voltage level shifts to a higher value during the time a vehicle presence is detected. Waveshape B is the output of Schmitt trigger subcircuit 121 and is an electrical impulse caused by and synchronized with the voltage level change of entrance sensor 11. Waveshape C is the output of exit sensor 18. Waveshape D is the output of Schmitt trigger subcircuit 122. Waveshape E is the output of bistable subcircuit 131, it can be seen that the pulse from entrance Schmitt trigger 121 turns the subcircuit 131 ON and the pulse from exit Schmitt trigger 122 turns it OFF. During the time interval that the bistable subcircuit 131 is turned on propulsion coil current flows as shown by waveshape F. Waveshape G through L are entirely similar to waveshapes A through F except that they pretain to switching circuit 23 and propulsion coil 20.

Wire 120 connects supply bus 30 voltage to switching circuit 13 when switching circuit 23 is conducting. This voltage is routed thru delay subcircuit 135 thru OR gate subcircuit 133 thru wire 137 to the reset input of bistable subcircuit 131 and thusly prevents propulsion coil 10 from being energized whilst propulsion coil 20 is energized. When switching circuit 23 is not conducting the voltage at wire 120 will be zero and switching circuit 13 is allowed to operate normally. This feature provides safety and automatically insures sufficient headway between adjacent vehicles in an elongated guideway comprising several linear solenoid motor sections and several vehicles.

What I claim is:

1. A conventional electrically operated linear solenoid motor for moving a ferromagnetic vehicle member relative to a stationary structure comprising in combination: a series of electromagnetic propulsion coils encompassing and spaced along a vehicle guideway; a power distribution system; vehicle position sensors which influence propulsion coil current switching circuits so as to produce vehicle motion; solid state switching circuits regulating and controlling propulsion coil current flow; wherein the improvement comprises: coil cooling and ventilating openings through the guideway structure within the area enclosed by the propulsion coils and arranged around the guideway circumference in such a manner as to not interfere with vehicle suspension systems.

2. A vehicle propulsion system as in claim 1, including a vehicle suspension system comprised in part of a wheel type main suspension system mounted on the vehicle center line allowing vehicle longitudinal motion and providing vehicle vertical support within the guideway.

3. A vehicle propulsion system as in claim 1, including one or more sets of lateral guide wheels located on the vehicle periphery in such a manner as to control extremes of vehicle lateral motion.

4. A vehicle propulsion system as in claim 1, including a groove in the guideway structure to engage with main suspension wheels in such a manner as to provide vehicle orientation consistant with maximum passenger comfort on straight line and curved guideway sections.

* * * * *